US012597329B2

(12) United States Patent
Hayek

(10) Patent No.: US 12,597,329 B2
(45) Date of Patent: Apr. 7, 2026

(54) CELLULAR AND LOCAL AREA NETWORK (LAN) CONVERTERS FOR PREMISES MONITORING SYSTEMS

(71) Applicant: The ADT Security Corporation, Boca Raton, FL (US)

(72) Inventor: Charbel E. Hayek, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 15 days.

(21) Appl. No.: 18/399,908

(22) Filed: Dec. 29, 2023

(65) Prior Publication Data

US 2025/0218263 A1      Jul. 3, 2025

(51) Int. Cl.
| | |
|---|---|
| *G08B 13/19* | (2006.01) |
| *G08B 13/196* | (2006.01) |
| *G08B 21/02* | (2006.01) |
| *G08B 25/00* | (2006.01) |
| *G08B 25/10* | (2006.01) |

(Continued)

(52) U.S. Cl.
CPC ....... *G08B 13/19667* (2013.01); *G08B 21/02* (2013.01); *G08B 25/004* (2013.01); *G08B 25/10* (2013.01); *H04W 4/029* (2018.02); *H04W 72/21* (2023.01); *H04W 72/23* (2023.01); *H04W 84/12* (2013.01)

(58) Field of Classification Search
CPC .............. G08B 13/19667; G08B 21/02; G08B 25/004; G08B 25/10; H04W 4/029; H04W 72/21; H04W 72/23; H04W 84/12

USPC ...................................................... 375/240.01
See application file for complete search history.

(56) References Cited

U.S. PATENT DOCUMENTS

| | | | |
|---|---|---|---|
| 9,131,364 B2 | 9/2015 | Howard et al. | |
| 9,412,248 B1 | 8/2016 | Cohn et al. | |

(Continued)

FOREIGN PATENT DOCUMENTS

| | | |
|---|---|---|
| EP | 3116245 B1 | 11/2017 |
| EP | 3761687 A1 | 1/2021 |

(Continued)

OTHER PUBLICATIONS

Inseego Wavemaker 5G indoor router FX2000 User Guide; Inseego Corporation; 2022; consisting of 90-pages.

(Continued)

*Primary Examiner* — Dominic D Saltarelli
(74) *Attorney, Agent, or Firm* — Weisberg I.P. Law, P.A.

(57) ABSTRACT

A cellular converter in communication with at least one premises device of a premises monitoring system and at least one client device is provided. The cellular converter is configured to route cellular communications between a cellular communication network and the at least one premises device and between the cellular communication network and the at least one client device, monitor first cellular bandwidth utilization by at least one premises device of a premises monitoring system, monitor second cellular bandwidth utilization by at least one client device, and maintain at least a minimum cellular data bandwidth for the at least one premises device based on the monitoring of the first cellular bandwidth utilization and the monitoring of the second cellular bandwidth utilization.

20 Claims, 4 Drawing Sheets

(51) Int. Cl.

| | | |
|---|---|---|
| *H04W 4/029* | (2018.01) |
| *H04W 72/21* | (2023.01) |
| *H04W 72/23* | (2023.01) |
| *H04W 84/12* | (2009.01) |

(56) References Cited

U.S. PATENT DOCUMENTS

| | | | |
|---|---|---|---|
| 9,462,453 B2 | 10/2016 | Mohammed et al. |
| 9,495,849 B2 | 11/2016 | Jentoft |
| 9,679,454 B2 | 6/2017 | Mishra et al. |
| 9,877,275 B2 | 1/2018 | Korneluk et al. |
| 9,886,839 B2 | 2/2018 | Martin |
| 10,021,558 B2 | 7/2018 | Lalwaney |
| 10,356,368 B2 | 7/2019 | Vourkoutiotis |
| 10,565,840 B2 | 2/2020 | Vanchev |
| 11,373,514 B2 | 6/2022 | Slavin |
| 11,616,734 B2 * | 3/2023 | Ganesan ............... H04L 47/808 |
| | | 370/477 |
| 11,663,902 B2 | 5/2023 | Cohn et al. |
| 12,047,476 B2 | 7/2024 | Lamb et al. |
| 2010/0208852 A1 | 8/2010 | Feher |
| 2010/0263032 A1 | 10/2010 | Bhuyan et al. |
| 2013/0010773 A1 | 1/2013 | Hong et al. |
| 2014/0071967 A1 | 3/2014 | Velasco |
| 2014/0143534 A1 | 5/2014 | Chastain et al. |
| 2015/0139042 A1 | 5/2015 | Connelly et al. |
| 2016/0020802 A1 | 1/2016 | Lee et al. |
| 2016/0150530 A1 | 5/2016 | Fujisaki |
| 2016/0330608 A1 | 11/2016 | Benn |
| 2017/0019297 A1 | 1/2017 | Rakib |
| 2017/0310500 A1 | 10/2017 | Dawes |
| 2017/0317990 A1 | 11/2017 | Kim et al. |
| 2021/0158688 A1 | 5/2021 | Lau et al. |
| 2022/0165148 A1 | 5/2022 | Baum et al. |
| 2022/0210722 A1 | 6/2022 | Saini et al. |

FOREIGN PATENT DOCUMENTS

| | | |
|---|---|---|
| EP | 4021042 A1 | 6/2022 |
| KR | 102425368 B1 | 7/2022 |
| WO | 2009055827 A1 | 4/2009 |
| WO | 2013093555 A1 | 6/2013 |
| WO | 2019136044 A1 | 7/2019 |

OTHER PUBLICATIONS

International Search Report and Written Opinion dated Feb. 20, 2023 for Application No. PCT/US2022/047718 filed Oct. 25, 2022, consisting of 18 pages.
International Search Report and Written Opinion dated Oct. 14, 2020 for Application No. PCT/US2020/041626 filed Jul. 10, 2020, consisting of 6 pages.
European Search Report dated Jun. 28, 2023 for Application No. 20836719.3, consisting of 6 pages.

* cited by examiner

BEGIN

Receive, from a cellular provider, subscription information indicating: <u>S100</u>

An uplink and downlink cellular data bandwidth allocation in the cellular network for data associated with the plurality of premise devices and the plurality of client devices <u>S102</u>

A prescribed minimum available uplink and downlink cellular data bandwidth of the uplink and downlink cellular data bandwidth allocation only for data associated with the plurality of premises devices <u>S104</u>

Monitor first uplink and downlink cellular data bandwidth utilization of data associated with the plurality of premise devices <u>S106</u>

Monitor second uplink and downlink cellular data bandwidth utilization for data associated with the plurality of client devices <u>S108</u>

Determine whether a current available uplink and downlink cellular data bandwidth is at the prescribed minimum available uplink and downlink cellular data bandwidth based on the monitoring of the first uplink and downlink cellular data bandwidth utilization and the monitoring of the second uplink and downlink cellular bandwidth utilization <u>S110</u>

In response to determining the current available uplink and downlink cellular data bandwidth is at the prescribed minimum available uplink and downlink cellular data bandwidth, reduce the second uplink and downlink cellular data bandwidth utilization for data associated with the plurality of client devices <u>S112</u>

END

FIG. 4

CELLULAR AND LOCAL AREA NETWORK (LAN) CONVERTERS FOR PREMISES MONITORING SYSTEMS

TECHNICAL FIELD

The present technology is generally related to cellular and local area network (LAN) converters for devices associated with premises monitoring systems.

BACKGROUND

Premises monitoring systems, such as home alarm systems that detect intrusions, smoke, carbon monoxide, etc., may include premises video monitoring devices that may be placed at premises to monitor the premises under the supervision of a central monitoring office. Communications between the central monitoring office and the premises monitoring equipment may be by wireless communications or wireline communications.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 4 is a flowchart of an example process according to some embodiments of the present disclosure.

DETAILED DESCRIPTION

Figure 1:
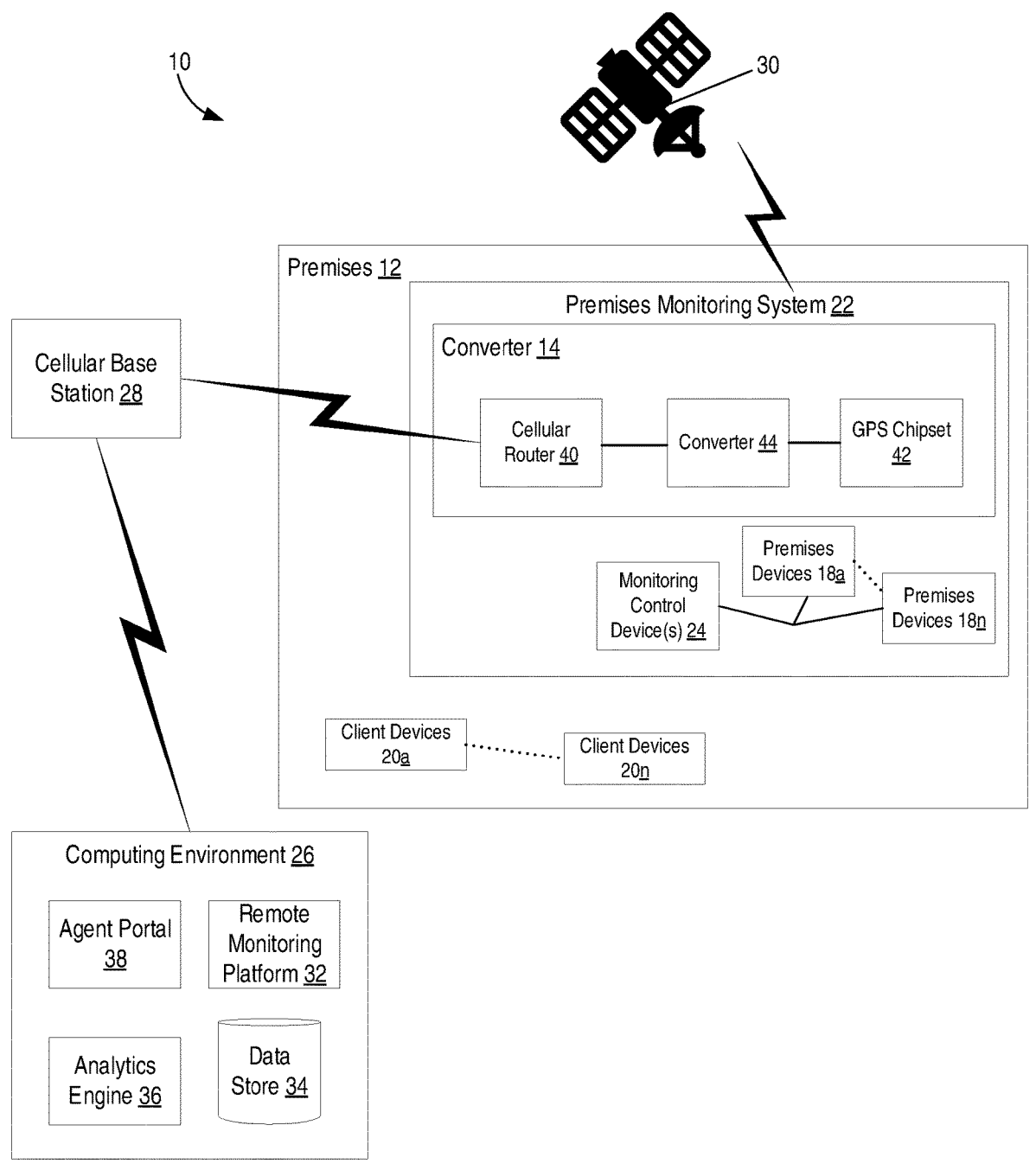
FIG. 1 is a block diagram of a network environment with a cellular and LAN converter for providing internet services to premises customers.

FIG. 1 is a block diagram of an example of a networked environment 10 according to some embodiments of the present disclosure. Networked environment 10 includes a premises 12 having a cellular and LAN converter 14 (herein referred to as the cellular converter 14). Cellular converter 14 may be a cellular-to-LAN converter that is configured to convert cellular communications or cellular data to LAN communications or LAN data, and vice-versa, as described herein. The networked environment 10 further includes premises devices 18a-18n and client devices 20a-20n. The premises devices 18a-18n, (collectively referred to as premises devices 18), may form part of a premises monitoring system 22, which is controlled by one or more monitoring control devices 24.

The premises monitoring system 22 may be or include a burglary alarm system, an alarm system for monitoring the safety of life and/or property, a home automation system, and/or other types of systems for premises monitoring. To this end, the premises monitoring system 22 may include one or more premises devices 18, which may include sensors, image capture devices, audio capture devices (e.g., microphone), life safety devices, premises automation devices, and/or other devices. For example, the types of sensors may include motion sensors, fire sensors, carbon monoxide sensors, flooding sensors, contact sensors, and other sensor types. Image capture devices may include still cameras, doorbell camera and/or video cameras, among other image capture devices. Premises automation devices may include lighting devices, climate control devices, and other types of devices. Some premises devices 18 may be configured for sensing one or more aspects of premises, such as an open or closed door, open or closed window, motion, heat, smoke, gas, sounds, images, people, animals, objects, etc.

The client devices 20a-20n, (collectively referred to as client devices 20) may be, for example, devices that can communicate with other devices over the Internet and do not form part of the premises monitoring system 22. A client device 20 in various embodiments may be a personal computer, a mobile phone, a smart television (TV), a smart watch, an internet video game device, etc.

In a location that is typically remote from the premises 12 is a computing environment 26 that may include one or more computing systems, such as server computing systems, in wireless communication with a cellular base station 28 and/or one or more global positioning system (GPS) satellites 30. The cellular base station 28 may be, for example, a fifth-generation (5G) radio base station. In particular, components in computing environment 26, such as a remote monitoring platform 32, may monitor and/or manage premises monitoring systems 22. The computing environment 26, may receive data from the premises monitoring system 22 concerning LAN (e.g., WI-FI) outages and loss of power at the monitoring control device 24. This data may be sent to the computing environment 26 for analysis, as described herein. In some instances, it may not be possible for components in the computing environment 26 to determine the reason why the monitoring control device 24 lost power and/or internet connection. However, the remote monitoring platform 32 may have information or may retrieve customer data, such as the physical address of each monitoring control device 24, since the computing environment 26 has access to such customer data due, in part, to the monitoring services provided by the computing environment 26. Using at least some of the customer data and other data (e.g., status data, geographical data, etc.), the computing environment 26 may aggregate, and perform determinations on potential outages.

Monitoring control device 24 may be configured for controlling and/or managing the premises monitoring system 22 and/or premises devices 18. To this end, monitoring control device 24 may include components, such as a keypad, buttons, display screen, buzzer, and/or speaker, that may facilitate a user interacting with monitoring control device 24. In some embodiments, monitoring control device 24 may be an alarm system control panel, a keypad, or a home automation hub device. Additionally, a monitoring control device 24 in some embodiments may include a personal computer, smart phone, tablet computer, etc., with an application, such as a web browser or dedicated application, that facilitates controlling and/or managing the premises monitoring system 22 and/or premises devices 18. In one or more embodiments, the monitoring control device 24 is configured to generate and transmit status reports, as described herein. Monitoring control device 24 and premises devices 18 may communicate with each other using various protocols and network topologies. For example, the monitoring control device 24 and premises devices 18 may wirelessly communicate using communications compliant with one or more versions of the Z-WAVE protocol, ZIG-BEE protocol, WI-FI protocol, THREAD protocol, BLU-ETOOTH protocol, Digital Enhanced Cordless Telecommunications (DECT) protocol, and/or other protocols.

The premises monitoring system 22 may be in communication with components of the computing environment 26 via one or more networks, which may include, for example, one or more intranets, extranets, wide area networks (WANs), LANs, wired networks, wireless networks, cellular networks, satellite networks, Data Over Cable Service Interface Specification (DOCSIS) networks, cellular networks, Plain Old Telephone Service (POTS) networks, and/or other types of networks. Premises monitoring system 22 may also be configured to communicate with components of the computing environment 26 via the cellular network via the cellular base station 28.

Still referring to FIG. 1, the computing environment 26 includes a remote monitoring platform 32, data store 34, analytics engine 36 and agent portal 38. Remote monitoring platform 32 may be configured to perform and/or trigger one or more functions and/or processes performed by the computing environment 26, such as, for example, functions and/or processes associated with monitoring for power outages and/or internet outages based on at least one status reports from various monitoring control devices 24, as described herein.

Data store 34 may be a secure data store that is configured for at least temporary storage of data for retrieval, management and/or analysis. For example, data store 34 may store one or more of status reports, power outage data, internet outage data, backup power source data for one or more premises, physical address information for various premises monitoring systems 22, etc.

Analytics engine 36 may perform one or more analytic functions and/or processes, as described herein. For example, analytics engine 36 may be configured to perform one or more analytic functions and/or processes, such as determining whether a power outage and/or internet outage occurred, as described herein.

Computing environment 26 may also provide one or more agent portals 38 that may facilitate monitoring agents associated with computing environment 26 in initiating and/or performing one or more monitoring actions. For example, in the event that the remote monitoring platform 32 receives status reports and analytics engine 36 determines an outage occurred, the agent portal 38 may render for display various information associated with the outage.

The cellular converter 14 may provide conversion to/from cellular communications (e.g., cellular data) from/to LAN communications (e.g., data to be routed via a LAN (e.g., WI-FI and/or ETHERNET) to and from premises devices 18 and client devices 20). The GPS chipset 42 is configured to receive positioning and timing information from one or more GPS satellites 30. In particular, in one or more embodiments, GPS chipset 42 is configured to calculate its location based on data received from one or more GPS satellites 30 and provide location and time information that can be transferred via cellular data or internet data, as described herein. In one or more embodiments, the GPS chipset 42 and GPS functionality may be omitted from cellular converter 14 without affecting other non-GPS functionality described herein. The converter 44 is configured to monitor and allocate bandwidth usage of the premises devices 18 and the client devices 20 and ensure there is at least a minimum amount of available cellular bandwidth for premises devices 18 to communicate data.

Figure 2:
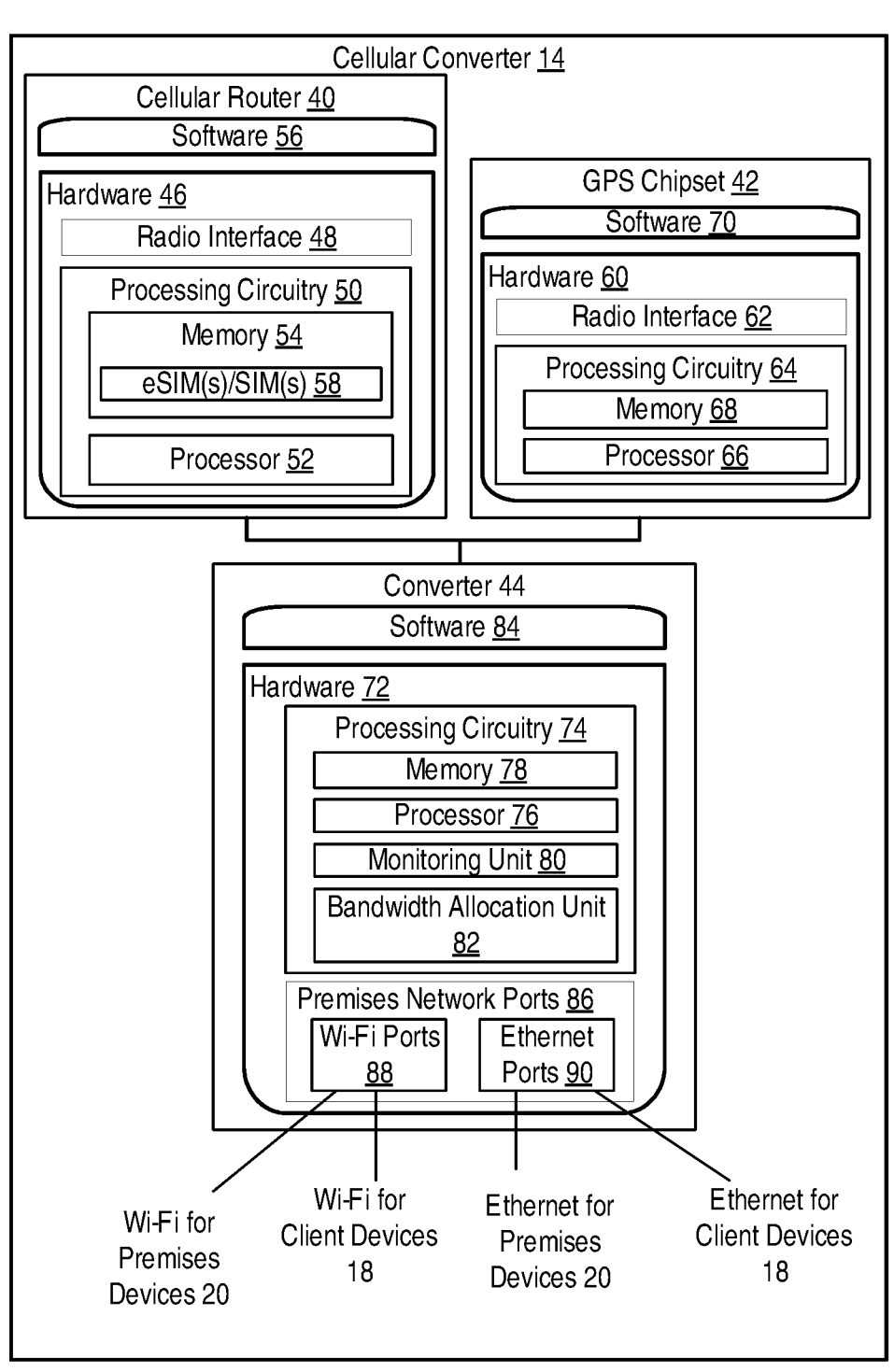
FIG. 2 is a block diagram of a cellular and LAN converter for providing internet services to premises customers.

FIG. 2 is a more detailed block diagram of the cellular converter 14 in FIG. 1, including the cellular router 40, the GPS chipset 42 and converter 44, described above. The cellular router 40 is configured to communicate information between the cellular base station 28 and the premises monitoring system 22 and its associated premises devices 18. The cellular router 40 is also configured to communicate information between the cellular base station 28 and the client devices 20.

As shown, cellular router 40 comprises hardware 46. The hardware may include the radio interface 48 is configured to receive and transmit signals from and to the cellular base station 28. Signals received from the cellular base station 28 may include control signaling to control the states of premises devices 18 and/or client devices 20. Signals transmitted to the cellular base station 28 may include data concerning the states of the premises devices 18, client devices 20, and/or GPS location data. Signals received from the cellular base station 28 may include information, data, voice and video to be rendered on premises devices 18 and/or client devices 20.

The hardware 46 may further include processing circuitry 50. The processing circuitry 50 is configured to perform baseband processing of the signaling received and/or transmitted by the radio interface 48. The baseband processing by the processing circuitry 50 may include coding and decoding, modulation and demodulation and other cellular transceiver functions. The processing circuitry 50 may include one or more processors 52 and one or more memories 54. Each processor 52 may include and/or be associated with one or more central processing units, data buses, buffers, and interfaces to facilitate operation. In addition to or instead of a processor 52 and memory 54, the processing circuitry 50 may comprise other types of integrated circuitry that performs various functionality. Integrated circuitry may include one or more processors 52, processor cores, field programmable gate arrays (FPGAs), application specific integrated circuits (ASICs), graphics processing units (GPUs), Systems on Chips (SoCs), or other components configured to execute instructions. The processor 52 may be configured to access (e.g., write to and/or read from) the memory 54, which may comprise any kind of volatile and/or nonvolatile memory, e.g., cache, buffer memory, random access memory (RAM), read-only memory (ROM), optical memory, and/or erasable programmable read-only memory (EPROM). Further, memory 54 may be embodied in the form of one or more storage devices. The processing circuitry 50 may be configured to perform various functionality described herein. For example, computer instructions may be stored in memory 54 and/or another computer-readable medium that, when executed by processor 52, causes the processor 52 to perform various functionality described herein.

Cellular router 40 further has software 56 (which may include one or more software applications) stored internally in, for example, memory 54, or stored in external memory (e.g., database, storage array, network storage devices, etc.) accessible by the cellular router 40 via an external connection. Software 56 may include any software or program that configures processing circuitry 50 to perform the steps or processes, as described herein.

The processing circuitry 50 may be configured to control any of the methods and/or processes described herein and/or to cause such methods, and/or processes to be performed, e.g., by cellular router 40. Processor 52 corresponds to one or more processors 52 for performing cellular router 40 functions described herein. The memory 54 is configured to store data and/or files and/or other information/data. In some embodiments, the software 56 may include instructions that, when executed by the processor 52 and/or processing circuitry 50, causes the processor 52 and/or processing circuitry 50 to perform the processes with respect to cellular router 40. Accordingly, by having computer instructions stored in memory 54 accessible to the processor 52, the processor 52 may be configured to perform the actions described herein.

In one or more embodiments, memory 54 stores the electronic subscriber identity module (eSIM) 58 where eSIM 58 stores information that identifies a subscriber to the cellular network.

In some embodiments, a SIM may be utilized instead of a stored eSIM 58. In some embodiments, the eSIM 58 may be configured to enable cellular communications between cellular router 40 and the cellular network, thereby enabling cellular converter 14 to transmit and/or receive cellular communications via cellular router 40. Converter 44 provides Internet services to premises devices 18 and/or client devices 20. Some embodiments may include two eSIMs 58: one for cellular communications for premises devices 18 and one for cellular communications for client devices 20. The eSIM 58 may be configured to provide cellular communications for the client devices 20 according to a first subscription and/or provide cellular communications for the premises devices 18 according to a second subscription, or the subscriber may subscribe to both services with a single subscription. For example, a monitoring service provider may enter an agreement with a cellular service provider to provide cellular bandwidth (e.g., cellular service) that enables the monitoring service provider to provide Internet service as well as monitoring services to a monitoring service subscriber.

Further, GPS chipset 42 may comprise hardware 60. The hardware 60 may include the radio interface 62 that is configured to receive positioning information and timing information from one or more GPS satellites 30. In one or more embodiments, radio interface 62 is configured to perform one-way communications with three or more GPS satellites 30 by, for example, receiving data and/or information from the three or more GPS satellites 30. The hardware 60 may further include processing circuitry 64. The processing circuitry 64 is configured to process the positioning and timing information to provide a position and real-time information to, for example, the premises devices 18 and/or client devices 20, and/or to use the positioning and/or timing information to trigger an action such as, for example, causing computing environment 26 to update, modify or change the cellular provider (e.g., reconfiguring eSIM(s) 58) for cellular converter 14 based on the geographical location of cellular converter 14. The processing circuitry 64 may include one or more processors 66 and one or more memories 68. Each processor 66 may include and/or be associated with one or more central processing units, data buses, buffers, and interfaces to facilitate operation. In addition to or instead of a processor 66 and memory 68, the processing circuitry 64 may comprise other types of integrated circuitry that performs various functionality. Integrated circuitry may include one or more processors 66, processor cores, FPGAs, ASICs, GPUs, SoCs, or other components configured to execute instructions. The processor 66 may be configured to access (e.g., write to and/or read from) the memory 68, which may comprise any kind of volatile and/or nonvolatile memory, e.g., cache, buffer memory, RAM, ROM, optical memory, and/or EPROM. Further, memory 68 may be embodied in the form of one or more storage devices. The processing circuitry 64 may be configured to perform various functionality described herein. For example, computer instructions may be stored in memory 68 and/or another computer-readable medium that, when executed by processor 66, causes the processor 66 to perform various functionality described herein.

GPS chipset 42 further has software 70 (which may include one or more software applications) stored internally in, for example, memory 68, or stored in external memory (e.g., database, storage array, network storage devices, etc.) accessible by the GPS chipset 42 via an external connection. Software 70 may include any software or program that configures processing circuitry 64 to perform the steps or processes, as described herein.

The processing circuitry 64 may be configured to control any of the methods and/or processes described herein and/or to cause such methods, and/or processes to be performed, e.g., by GPS chipset 42. Processor 66 corresponds to one or more processors 66 for performing GPS chipset 42 functions described herein. The memory 68 is configured to store data and/or files and/or other information/data. In some embodiments, the software 70 may include instructions that, when executed by the processor 66 and/or processing circuitry 64, causes the processor 66 and/or processing circuitry 64 to perform the processes with respect to GPS chipset 42. Accordingly, by having computer instructions stored in memory 68 accessible to the processor 66, the processor 66 may be configured to perform the actions described herein.

Further, converter 44 may comprise hardware 72. The hardware 72 may include processing circuitry 74. The processing circuitry 74 is configured to perform one or more converter 44 functions as described herein. The processing circuitry 74 may include one or more processors 76 and one or more memories 78. Each processor 76 may include and/or be associated with one or more central processing units, data buses, buffers, and interfaces to facilitate operation. In addition to or instead of a processor 76 and memory 78, the processing circuitry 74 may comprise other types of integrated circuitry that performs various functionality. Integrated circuitry may include one or more processors 76, processor cores, FPGAs, ASICs, GPUs, SoCs, or other components configured to execute instructions. The processor 76 may be configured to access (e.g., write to and/or read from) the memory 78, which may comprise any kind of volatile and/or nonvolatile memory, e.g., cache, buffer memory, RAM, ROM, optical memory, and/or EPROM. Further, memory 78 may be embodied in the form of one or more storage devices. The processing circuitry 74 may be configured to perform various functionality described herein. For example, processing circuitry 74 may comprise monitoring unit 80 configured to monitor bandwidth usage (e.g., uplink and/or downlink data bandwidth usage) by the premises devices 18, either individually or collectively, and optionally configured to monitor bandwidth usage by the client devices 20, either individually or collectively. The bandwidth usage may be measured in terms of bits per second, for example. The processing circuitry 74 may comprise bandwidth allocation unit 82 configured to allocate bandwidth between the premises devices 18 and the client devices 20. In some embodiments, the bandwidth allocation unit 82 may be configured to provide a minimum bandwidth to the premises devices 18 and/or maintain at least a minimum uplink and downlink cellular data bandwidth for the at least one premises device 18 as prescribed by a subscription for cellular services. This may be done by allocating bandwidth away from client devices 20 and/or by reserving a minimum amount of cellular bandwidth or resources for one or more premises devices 18. In some embodiments, allocating bandwidth away from the client devices 20 may be triggered when the monitoring unit 80 detects that bandwidth usage by the client devices 20 rises above a threshold and/or when there is a minimum amount of bandwidth available for premises devices 18. Further, in one or more embodiments, computer instructions may be stored in memory 78 and/or another computer-readable medium that, when executed by processor 76, causes the processor 76 to perform various functionality described herein.

Converter 44 further has software 84 (which may include one or more software applications) stored internally in, for example, memory 78, or stored in external memory (e.g., database, storage array, network storage devices, etc.) accessible by the convert 44 via an external connection. Software 84 may include any software or program that configures processing circuitry 74 to perform the steps or processes, as described herein.

The processing circuitry 74 may be configured to control any of the methods and/or processes described herein and/or to cause such methods, and/or processes to be performed, e.g., by converter 44. Processor 76 corresponds to one or more processors 76 for performing converter 44 functions described herein. The memory 78 is configured to store data and/or files and/or other information/data. In some embodiments, the software 84 may include instructions that, when executed by the processor 76 and/or processing circuitry 74, causes the processor 76 and/or processing circuitry 74 to perform the processes with respect to converter 44. Accordingly, by having computer instructions stored in memory 78 accessible to the processor 76, the processor 76 may be configured to perform the actions described herein.

Hardware 72 may further comprise premises network ports 86, which may include, for example, a WI-FI port 88 and an ETHERNET port 90. The WI-FI port 88 may be in communication with premises devices 18 and client devices 20. The WI-FI port 88 may be configured to route data and control signaling from the cellular router 40 to the premises devices 18 that are in wireless communication with the cellular converter 14. The WI-FI port 88 may be configured to route data and state information, for example, to the cellular router 40 so that the data and state information may be transmitted by the radio interface 48 of the cellular router 40 to the cellular base station 28. The WI-FI port 88 may be configured to route data, including video and voice, for example, to and from premises devices 20 and/or client devices 20. Note that although reference is made to cellular base stations and cellular radio interfaces, the principles disclosed herein apply to Fourth Generation (4G) cellular radio systems and/or 5G cellular radio systems or to cellular radio systems that evolve from 5G cellular radio systems, such as Sixth Generation (6G) radio systems currently under development.

The ETHERNET port 90 may be in communication with premises devices 18 and client devices 20. The ETHERNET port 90 may be configured to route data and control signaling (e.g., cellular communications) from the cellular router 40 to the premises devices 18 that are in wireless communication with the cellular converter 14. The ETHERNET port 90 may be configured to route data and state information, for example, to the cellular router 40 so that the data and state information may be transmitted by the radio interface 48 of the cellular router 40 to the cellular base station 28. The ETHERNET port 90 may be configured to route data, including video and voice, for example, to and from premises devices 20 and/or client devices 20.

Figure 3:
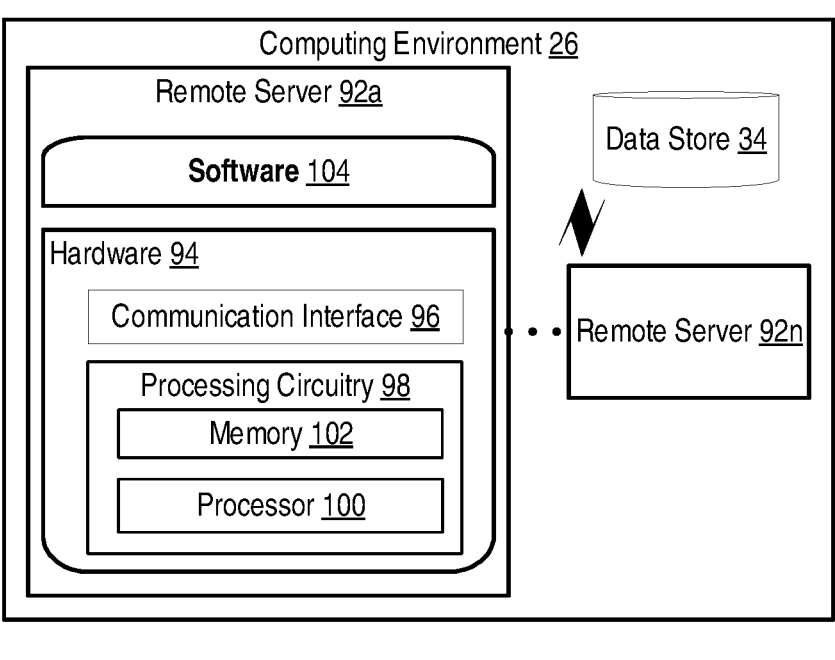
FIG. 3 is a block diagram of a premises monitoring system and a central station.
Figure 3:
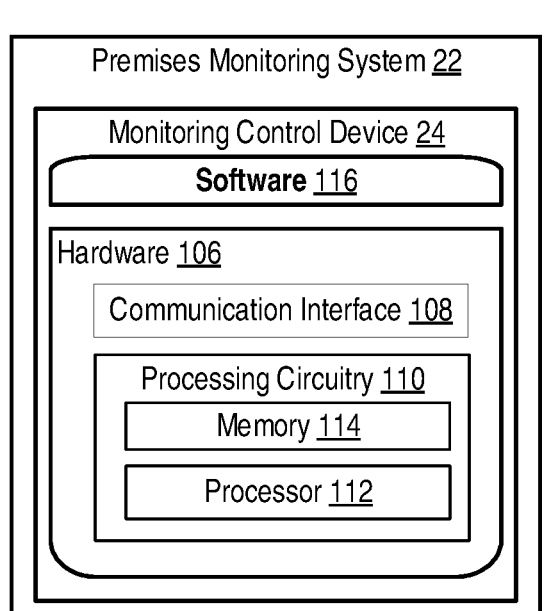

FIG. 3 is a block diagram illustrating examples of various components of the computing environment 26 and monitoring control device 24. As shown, computing environment 26 may comprise one or more remote servers 92a-92n (collectively referred to as remote server 92) that are configured to perform one or more computing environment functions that are described herein. In one or more embodiments, remote server 92 may be a computing device. For example, one or more functions may be performed in a single remote server 92 or may be distributed among two or more remote servers 92.

Each remote server 92 comprises hardware 94. The hardware 94 may include communication interface 96 for communicating with one or more entities in network environment 10. For example, communication interface 96 may be configured for establishing and maintaining at least a wireless or wired connection with one or more elements of premises monitoring system 22 and/or other entities such as, internet service providers (ISPs), utility companies, etc. The hardware 94 may further include processing circuitry 98. The processing circuitry 98 is configured to perform one or more remote server 92 functions. The processing circuitry 98 may include one or more processors 100 and one or more memories 102. Each processor 100 may include and/or be associated with one or more central processing units, data buses, buffers, and interfaces to facilitate operation. In addition to or instead of a processor 100 and memory 102, the processing circuitry 98 may comprise other types of integrated circuitry that performs various functionality. Integrated circuitry may include one or more processors 100, processor cores, FPGAs, ASICs, GPUs, SoCs, or other components configured to execute instructions. The processor 100 may be configured to access (e.g., write to and/or read from) the memory 102, which may comprise any kind of volatile and/or nonvolatile memory, e.g., cache, buffer memory, RAM, ROM, optical memory, and/or EPROM. Further, memory 102 may be embodied in the form of one or more storage devices. The processing circuitry 98 may be configured to perform various functionality described herein. For example, computer instructions may be stored in memory 102 and/or another computer-readable medium that, when executed by processor 100, causes the processor 100 to perform various functionality described herein.

Remote server 92 further has software 104 (which may include one or more software applications) stored internally in, for example, memory 102, or stored in external memory (e.g., database, storage array, network storage devices, etc.) accessible by the remote server 92 via an external connection. Software 104 may include any software or program that configures processing circuitry 98 to perform the steps or processes.

The processing circuitry 98 may be configured to control any of the methods and/or processes described herein and/or to cause such methods, and/or processes to be performed, e.g., by remote server 92. Processor 100 corresponds to one or more processors 100 for performing remote server 92 functions described herein. The memory 102 is configured to store data and/or files and/or other information/data. In some embodiments, the software 104 may include instructions that, when executed by the processor 100 and/or processing circuitry 98, causes the processor 100 and/or processing circuitry 98 to perform the processes with respect to remote server 92. Accordingly, by having computer instructions stored in memory 102 accessible to the processor 100, the processor 100 may be configured to perform the actions described herein.

Further, computing environment 26 may include a plurality of data stores 34. Still referring to FIG. 3, premises monitoring system 22 comprises monitoring control device 24. Monitoring control device 24 comprises hardware 106. The hardware 106 may include communication interface 108 for communicating with one or more entities in network environment 10. For example, communication interface 108 may be configured for establishing and maintaining at least a wireless or wired connection with one or more elements of premises monitoring system 22 and/or computing environment 26. Further, communication interface 108 may be configured to establish and maintain at least a wireless or wired connection with computing environment 26 such as with, for example, remote monitoring platform 32.

The hardware 106 may further include processing circuitry 110. The processing circuitry 110 is configured to perform one or more premises monitoring system 22 functions. The processing circuitry 110 may include one or more processors 112 and one or more memories 114. Each processor 112 may include and/or be associated with one or more central processing units, data buses, buffers, and interfaces to facilitate operation. In addition to or instead of a processor 112 and memory 114, the processing circuitry 110 may comprise other types of integrated circuitry that performs various functionality. Integrated circuitry may include one or more processors 112, processor cores, FPGAs, ASICs, GPUs, SoCs, or other components configured to execute instructions. The processor 112 may be configured to access (e.g., write to and/or read from) the memory 114, which may comprise any kind of volatile and/or nonvolatile memory, e.g., cache, buffer memory, RAM, ROM, optical memory, and/or EPROM. Further, memory 114 may be embodied in the form of one or more storage devices. The processing circuitry 110 may be configured to perform various functionality described herein. For example, computer instructions may be stored in memory 114 and/or another computer-readable medium that, when executed by processor 112, causes the processor 112 to perform various functionality described herein.

Premises monitoring system 22 further has software 116 (which may include one or more software applications) stored internally in, for example, memory 114, or stored in external memory (e.g., database, storage array, network storage devices, etc.) accessible by the monitoring control device 24 via an external connection. Software 116 may include any software or program that configures processing circuitry 110 to perform the steps or processes.

The processing circuitry 110 may be configured to control any of the methods and/or processes described herein and/or to cause such methods, and/or processes to be performed, e.g., by monitoring control device 24. Processor 112 corresponds to one or more processors 112 for performing monitoring control device 24 functions described herein. The memory 114 is configured to store data and/or files and/or other information/data. In some embodiments, the software 116 may include instructions that, when executed by the processor 112 and/or processing circuitry 110, causes the processor 112 and/or processing circuitry 110 to perform the processes with respect to monitoring control device 24. Accordingly, by having computer instructions stored in memory 114 accessible to the processor 112, the processor 112 may be configured to perform the actions described herein.

FIG. 4 is a flowchart depicting an example process according to some embodiments of the present disclosure. The process may be performed by cellular converter 14, including cellular router 40, GPS chipset 42 and converter 44 (including monitoring unit 80, bandwidth allocation unit 82, WI-FI ports 88, and ETHERNET ports 90). The process includes receiving, from a cellular provider, subscription information indicating (Block S100): an uplink and downlink cellular data bandwidth allocation in the cellular network for data associated with the plurality of premises devices 18 and the plurality of client devices 20 (Block S102), and a prescribed minimum available uplink and downlink cellular data bandwidth of the uplink and downlink cellular data bandwidth allocation only for data associated with the plurality of premises devices 18 (Block S104). The process includes monitoring first uplink and downlink cellular data bandwidth utilization of data associated with the plurality of premises devices 18 (Block S106).

The process includes monitoring second uplink and downlink cellular data bandwidth utilization for data associated with the plurality of client devices 20 (Block S108). The process includes determining whether a current available uplink and downlink cellular data bandwidth is at the prescribed minimum available uplink and downlink cellular data bandwidth based on the monitoring of the first uplink and downlink cellular data bandwidth utilization and the monitoring of the second uplink and downlink cellular data bandwidth utilization (Block S110). In response to determining the current available uplink and downlink cellular data bandwidth is at the prescribed minimum available uplink and downlink cellular data bandwidth, the process includes reducing the second uplink and downlink cellular data bandwidth utilization for data associated with the plurality of client devices 20 (Block S112).

In some embodiments, a cellular converter 14 configured to communicate between a cellular radio base station 28 and a premises network ports 86 that serves both premises device 18 and client devices 20. In some embodiments, the cellular converter 14 includes at least one processor 76 and at least one memory 78 storing instructions that, when executed by the at least one processor 76, are configured to cause the at least one processor 76 to: monitor first uplink and downlink cellular data bandwidth utilization by at least one premises device 18, the at least one premises device 18 providing premises monitoring functions; and monitor second uplink and downlink cellular data bandwidth utilization by at least one client device 20. The at least one processor 76 is also configured to allocate an uplink and downlink cellular data bandwidth to the at least one premises device 18 to maintain at least a minimum uplink and downlink cellular data bandwidth for the at least one premises device 18 as prescribed by a subscription for cellular services; and route cellular communications between a cellular communication network and the at least one premises device 18 and between the cellular communication network and the at least one client device 20 while maintaining at least the minimum uplink and downlink cellular data bandwidth for the at least one premises device 18.

In some embodiments, at least one client device 20 provides digital services not subject to control by a monitoring control device 24 and/or premises monitoring system 22. In some embodiments, the cellular converter includes an eSIM 58 configurable to enable cellular communications between cellular router 40 and a cellular network (e.g., via cellular base station 28), thereby, in various embodiments, enabling premises device(s) 18 and/or client device(s) 20 to communicate with the cellular network via cellular router 40. For example, cellular router 40 is configured to route cellular communications between the cellular network and the premises devices 18 via the premises network port 86 and between the cellular network and the client devices 20 via the premises network port 86 subject to the bandwidth allocation.

In some embodiments, the eSIM 58 is remotely configurable based on a subscription with a monitoring service provider. In some embodiments, the cellular converter 14 includes a first eSIM 58 configurable to enable cellular communications, via the cellular converter 14, with the at least one premises device 18 and a second eSIM 58 configurable to enable cellular communications, via the cellular converter 14, with the at least one client device 20. In some embodiments, routing cellular communications includes routing cellular data, via WI-FI signaling, to at least one premises device 18 and routing cellular data, via ETHERNET signaling, to at least one premises device 18. In some embodiments, routing cellular communications includes routing cellular data, via WI-FI signaling, to at least one client device 20 and routing cellular data, via ETHERNET signaling, to at least one client devices 20. In some embodiments, the cellular converter 14 includes a cellular radio interface 48 and baseband processor 52 configured to communicate wirelessly with a 5G radio base station 28. In some embodiments, the cellular converter 14 includes a GPS radio interface 62 and processor 66 where the processor 66 is configured to determine a location of the cellular converter 14 based on GPS signals received by GPS radio interface 62. In some embodiments, the first uplink and downlink cellular data bandwidth allocation is determined based at least in part on a priority of communications between the at least one premises device 18 and the at least one client device 20.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and sub-combination of these embodiments. Accordingly, all embodiments can be combined in any way and/or combination, and the present specification, including the drawings, shall be construed to constitute a complete written description of all combinations and sub-combinations of the embodiments described herein, and of the manner and process of making and using them, and shall support claims to any such combination or sub-combination.

In addition, unless mention was made above to the contrary, the accompanying drawings are not to scale. A variety of modifications and variations are possible in light of the above teachings without departing from the scope and spirit of the present disclosure.

What is claimed is:

1. A system, comprising:
   a premises monitoring system configured to monitor for safety of property and life at a premises, the premises monitoring system comprising a plurality of premises devices configured to monitor a plurality of conditions at the premises;
   a plurality of client devices configured to communicate via at least one wide area network, the plurality of client devices being located at the premises;
   a cellular converter, comprising:
      at least one premises network port configured to communicate with the premises monitoring system and the plurality of client devices via at least one non-cellular network;
      a cellular router configured to communicate data from the at least one premises network port to a cellular network;
      at least one processor; and at least one memory storing instructions that, when executed by the at least one processor, are configured to cause the at least one processor to:

receive subscription information indicating:

an uplink and downlink cellular data bandwidth allocation in the cellular network for data associated with the plurality of premises devices of the premises monitoring system and the plurality of client devices; and a prescribed minimum available uplink and downlink cellular data bandwidth of the uplink and downlink cellular data bandwidth allocation only for data associated with the plurality of premises devices of the premises monitoring system;

monitor first uplink and downlink cellular data bandwidth utilization of data associated with the plurality of premises devices of the premises monitoring system;

monitor second uplink and downlink cellular data bandwidth utilization for data associated with the plurality of client devices;

determine that a current available uplink and downlink cellular data bandwidth is at the prescribed minimum available uplink and downlink cellular data bandwidth based on the monitoring of the first uplink and downlink cellular data bandwidth utilization and the monitoring of the second uplink and downlink cellular data bandwidth utilization; and in response to determining the current available uplink and downlink cellular data bandwidth is at the prescribed minimum available uplink and downlink cellular data bandwidth, reduce the second uplink and downlink cellular data bandwidth utilization for data associated with the plurality of client devices.

2. A cellular converter configured to communicate with at least one premises device of a premises monitoring system and at least one client device, comprising:

at least one processor; and at least one memory storing instructions that, when executed by the at least one processor, cause the at least one processor to:

route a plurality of cellular communications between a cellular communication network and the at least one premises device and between the cellular communication network and the at least one client device;

monitor a first cellular bandwidth utilization by at least one premises device of a premises monitoring system;

monitor a second cellular bandwidth utilization by at least one client device; and maintain at least a minimum cellular bandwidth for the at least one premises device based on the first cellular bandwidth utilization and the second cellular bandwidth utilization.

3. The cellular converter of claim 2, wherein the at least one client device provides digital services not subject to control by the premises monitoring system.

4. The cellular converter of claim 2, further comprising an electronic subscriber identity module (eSIM) configurable to enable cellular communications for communicating data associated with the at least one premises monitoring device.

5. The cellular converter of claim 4, wherein the eSIM is remotely configurable to enable cellular communications for communicating data associated with the at least one premises device according to a subscription with a monitoring service provider.

6. The cellular converter of claim 4, wherein the eSIM is remotely configurable to enable cellular communications for communicating data associated with the at least one client device according to a subscription with a monitoring service provider.

7. The cellular converter of claim 2, further comprising a first electronic subscriber identity module (eSIM) configurable to enable cellular communications for communicating data associated with the at least one premises device and a second eSIM configurable to enable cellular communications for communicating data associated with the at least one client device.

8. The cellular converter of claim 2, wherein routing of cellular communications includes:

routing WI-FI data, via cellular signaling, to the cellular communication network, the WI-FI data being received from the at least one premises device; and routing ETHERNET data, via cellular singling, to the cellular communication network, the ETHERNET data being received from the at least one premises device.

9. The cellular converter of claim 8, wherein routing of cellular communications includes:

routing WI-FI data, via cellular signaling, to the cellular communication network, the WI-FI data being received from the at least one client device; and routing ETHERNET data, via cellular singling, to the cellular communication network, the ETHERNET data being received from the at least one client device.

10. The cellular converter of claim 2, further comprising a cellular radio interface and baseband processor configured to communicate wirelessly with a fifth-generation (5G) radio base station of the cellular communication network.

11. The cellular converter of claim 2, further comprising a radio interface configured to receive positioning information and timing information, the at least one processor configured to:

process the positioning information and the timing information; and provide a position and real-time information to at least one of the at least one premises device and the at least one client device.

12. The cellular converter of claim 2, wherein the instructions are further configured to cause the at least one processor to allocate a minimum cellular bandwidth to the at least one premises device based at least in part on a priority of communications between the at least one premises device and the at least one client device.

13. A method implemented by a cellular converter, the cellular converter being in communication with at least one premises device of a premises monitoring system and at least one client device, the method comprising:

routing a plurality of cellular communications between a cellular communication network and the at least one premises device and between the cellular communication network and the at least one client device;

monitoring first cellular bandwidth utilization by at least one premises device of a premises monitoring system;

monitoring second cellular bandwidth utilization by at least one client device; and maintaining at least a minimum cellular bandwidth for the at least one premises device based on the first cellular bandwidth utilization and the second cellular bandwidth utilization.

14. The method of claim 13, wherein the at least one client device provides digital services not subject to control by the premises monitoring system.

15. The method of claim 13, further comprising an electronic subscriber identity module (eSIM) configurable to enable cellular communications for communicating data associated with the at least one premises device.

16. The method of claim 13, further comprising a first electronic subscriber identity module (eSIM) configurable to enable cellular communications for communicating data associated with the at least one premises device and a second eSIM configurable to enable cellular communications for communicating data associated with the at least one client device.

17. The method of claim 13, wherein routing of cellular communications includes:

routing WI-FI data, via cellular signaling, to the cellular communication network, the WI-FI data being received from the at least one premises device; and routing ETHERNET data, via cellular singling, to the cellular communication network, the ETHERNET data being received from the at least one premises device.

18. The method of claim 17, wherein routing of cellular communications includes:

routing WI-FI data, via cellular signaling, to the cellular communication network, the WI-FI data being received from the at least one client device; and routing ETHERNET data, via cellular singling, to the cellular communication network, the ETHERNET data being received from the at least one client device.

19. The method of claim 13, further comprising communicating wirelessly with a Fifth Generation (5G) radio base station of the cellular communication network.

20. The method of claim 13, further comprising allocating a minimum cellular bandwidth to the at least one premises device based at least in part on a priority of communications between the at least one premises device and the at least one client device.

\* \* \* \* \*